Feb. 12, 1924.  1,483,786
H. L. DE ZENG
OPTICAL INSTRUMENT
Filed April 1, 1921   4 Sheets-Sheet 3
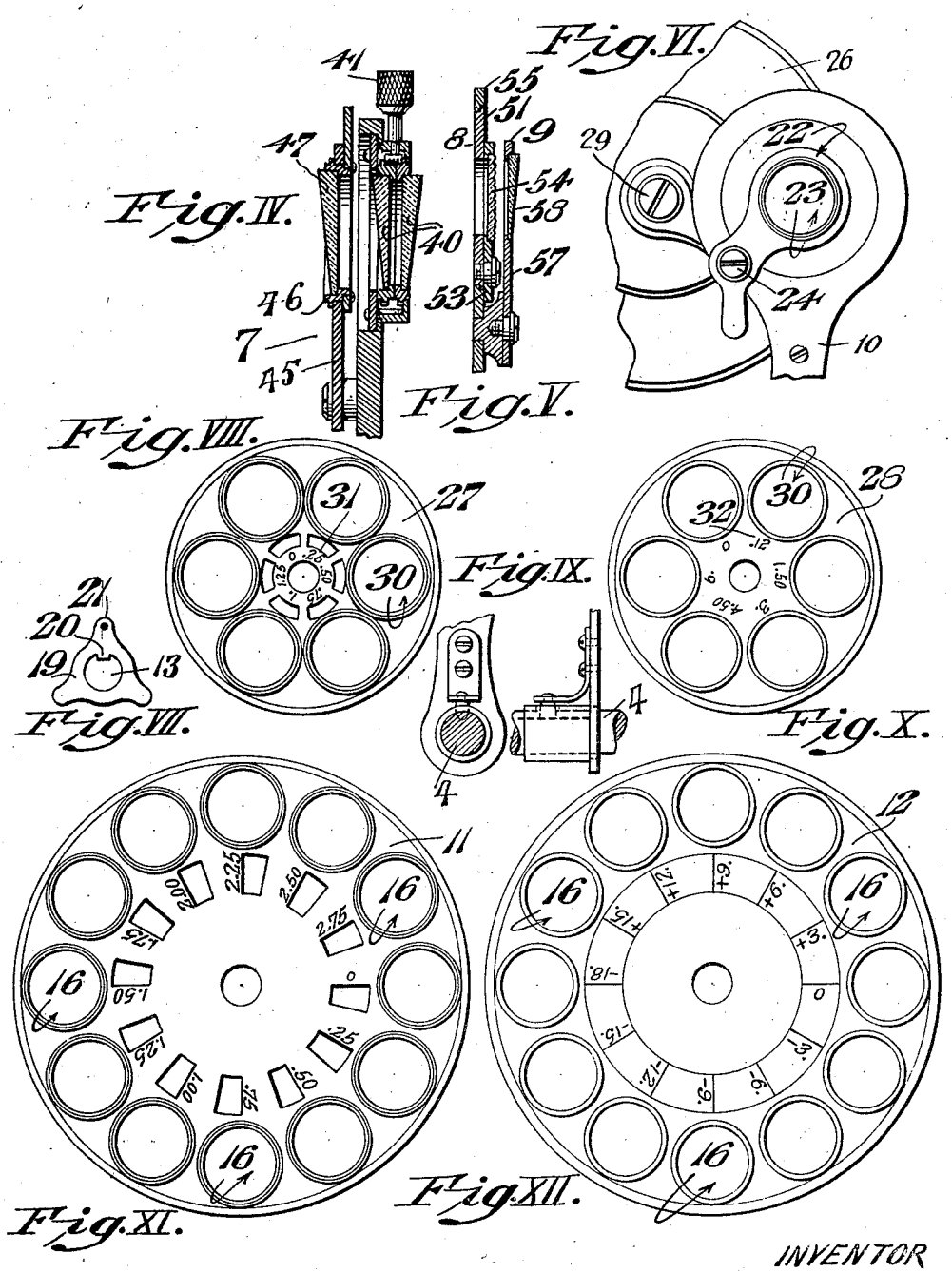
INVENTOR
HENRY L. DE ZENG.
By Harry H. Styll
ATTORNEY Feb. 12, 1924.                                                    1,483,786
                        H. L. DE ZENG
                       OPTICAL INSTRUMENT
                      Filed April 1, 1921        4 Sheets-Sheet 4
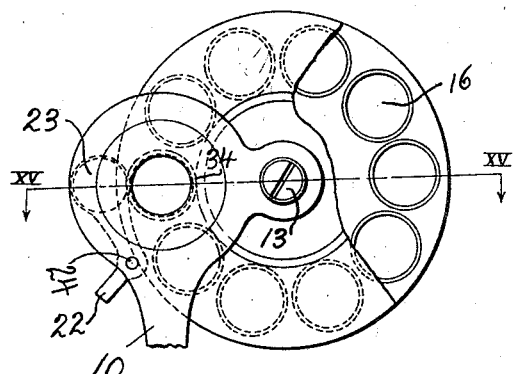
Fig. XIV
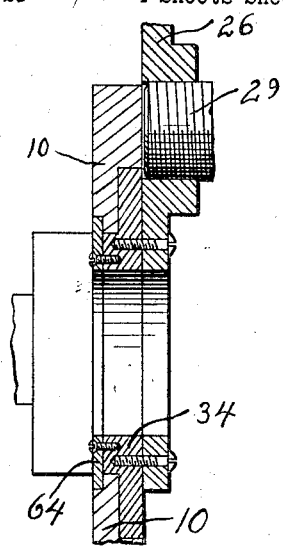
Fig. XVIII
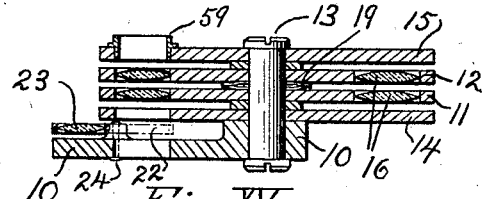
Fig. XV
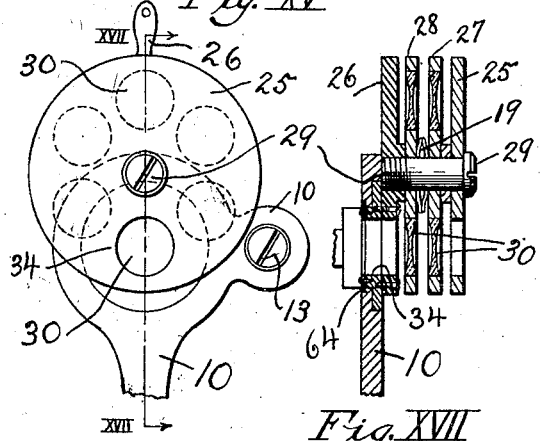
Fig. XVI     Fig. XVII
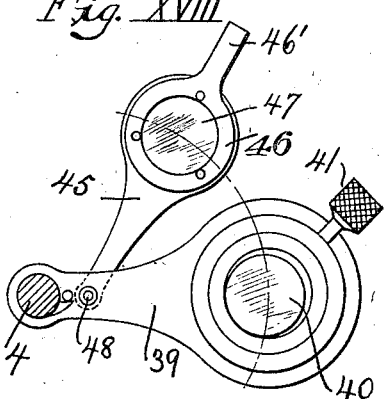
Fig. XIX
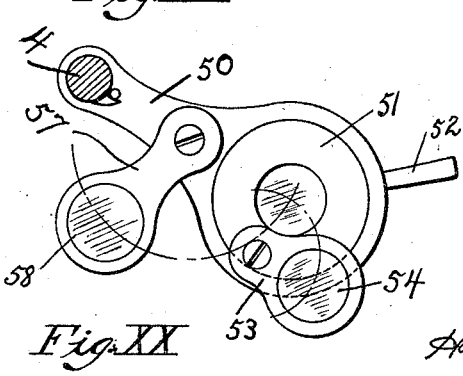
Fig. XX
INVENTOR
HENRY L. DeZENG.
BY
Harry H. Styll.
ATTORNEY Patented Feb. 12, 1924.

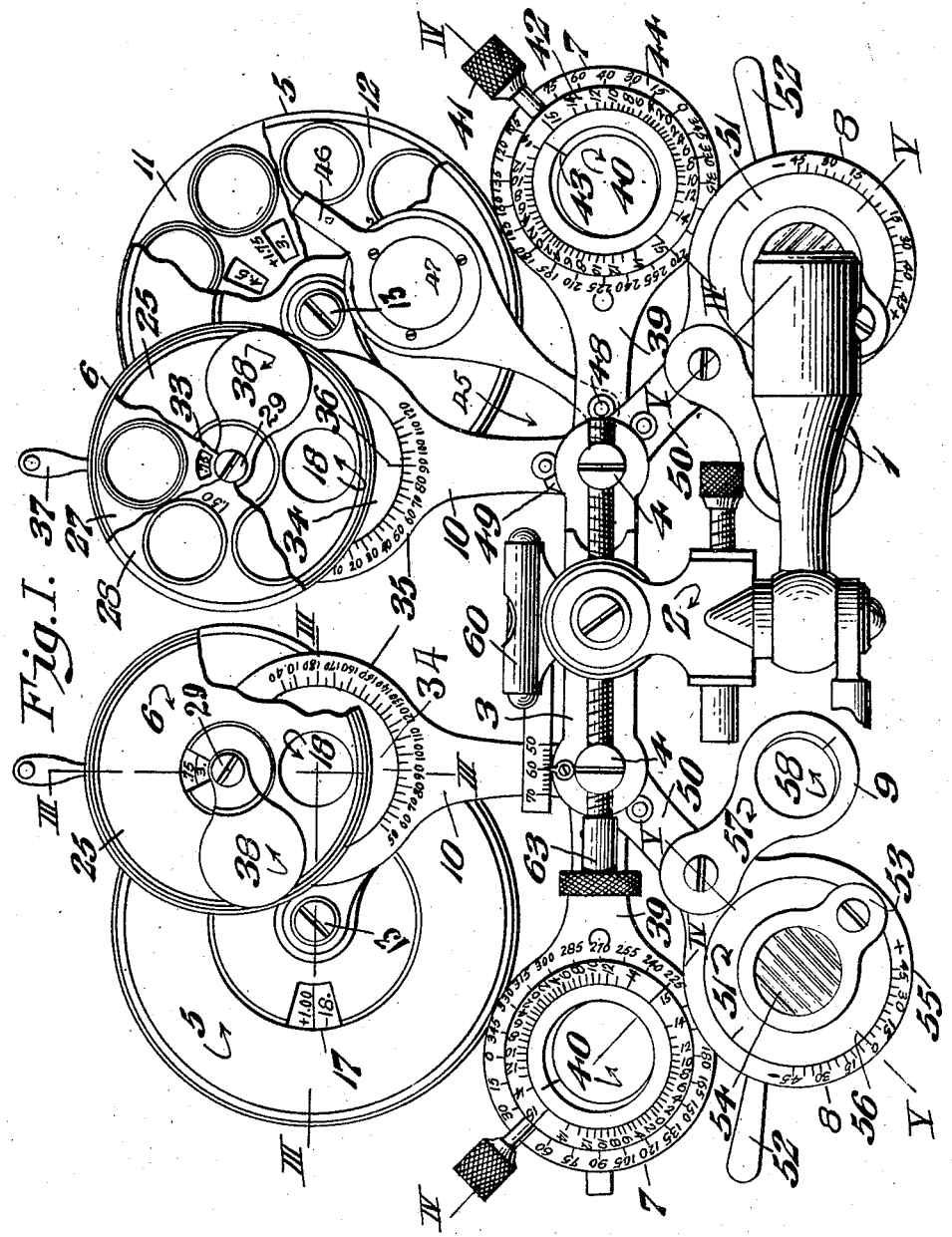

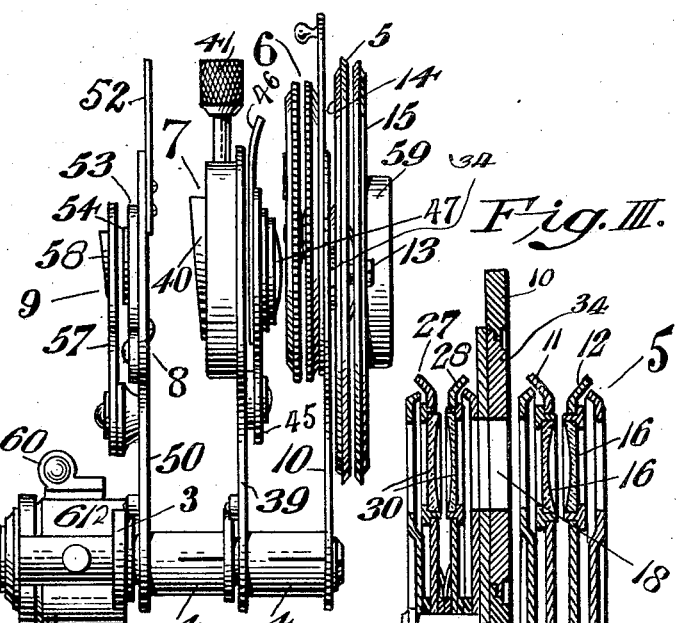

1,483,786

UNITED STATES PATENT OFFICE.

HENRY L. DE ZENG, OF MOORESTOWN, NEW JERSEY.

OPTICAL INSTRUMENT.

Application filed April 1, 1921. Serial No. 457,782.

*To all whom it may concern:*

Be it known that I, HENRY L. DE ZENG, a citizen of the United States, residing at Moorestown, in the county of Burlington and State of New Jersey, have invented certain new and useful Improvements in Optical Instruments, of which the following is a specification.

This invention relates to improvements in ophthalmological instruments and has particular reference to an improved form of instrument for use in measuring the various optical defects of vision and the status of the ocular motor muscles.

The principal object of this invention is the provision of an instrument which will enable the operator to measure for every refractive and muscular defect of vision of one eye without disturbing the normal poise of the other eye, a feature which is entirely novel with my invention.

One of the leading objects of the present invention is to produce an instrument complete in every detail for measuring the refraction of the eye and testing the strength of its various motor muscles.

Another of the objects of the invention is the provision of an instrument of this character which shall be small, neat, and sanitary, which shall cover a minimum portion of the face of the patient being tested, and which may be readily adjusted to conform to various inter-pupillary dimensions, and shall permit of quick and ready positioning of its various testing elements before the eyes of the patient.

Another object of the invention is the provision of a binocular type of instrument wherein cylindrical lenses as well as spherical lenses may be quickly placed before the eyes of the patient and the required axes of the cylindrical lenses obtained in any required meridian without the axis requirements of one eye interfering with the axis requirements of the other eye.

A further object of the invention is the provision of an instrument of this character in which a large number of lenses of cylindrical value may be readily positioned before the eye of the patient, in which the axes of all the cylinder lenses adapted to be placed before one eye of the patient may be simultaneously correspondingly shifted so that the several lenses as moved into operative position will each be presented with its axis in the same relationship to the eye.

Another important object of the invention is to provide a compact instrument, simple in construction, in which the separation of the various superimposed lenses and testing elements will be a minimum.

Other objects of the invention are to provide means by which the entire cylinder attachment may be rotated about the sight opening as a center of rotation; the provision of lenses of small diameter to keep the eye in the center of the lenses; the provision of a mobile prism unit of low power to obtain greater accuracy in measuring errors of low degree, with a supplementary prism of fixed value for adding to the value of the mobile unit; the provision for displacing the object vertically or horizontally as seen by the eye being tested for use as a monocular muscle test; the provision of means for splitting the powers of the spherical lenses; the provision for throwing a Maddox lens in or out of position without removing it from its proper alinement; provision for means for locking the various units in operative alinement; the provision of means for securing quick alinement of the lens carriers; the provision of a special and novel arrangement of the spherical lenses in separate rotatable carriers wherein the powers in one series advance by quarter dioptres, those in the other series by three dioptres, together with a supplementary lens of one eighth dioptre whereby the quarter dioptre powers may be split into variations of one-eighth dioptre powers; and the provision of friction means for holding the cylindrical series in any desired stopped position, together with many other improvements hereinafter set forth.

A further object of the invention consists in so mounting the various lenses in the several series making up the completed instrument, that by combining selected lenses from the several series any desired power and variance in power of lenses may be readily secured for testing purposes, while at the same time the total number of lenses, and thus the bulk of the instrument as an entirety is reduced to the lowest practicable minimum.

Further objects and advantages of my improved instrument include the simplification of parts and the various structural features and details by which the foregoing advantageous results may be accomplished in a practicable manner, and should be apparent from the following specification taken in connection with the accompanying drawings, in both of which the prefererd form is described by way of illustration only, but it will be understood that I may make any modifications in the specific details of construction shown and described within the scope of the appended claims without departing from or exceeding the spirit of the invention.

Figure I represents a front elevation of my complete instrument from the side of the operator.

Figure II represents a side elevation of Figure I.

Figure III represents a cross section on lines III—III of Figure I through the spherical and cylindrical cases on a horizontal line, showing the lenses in alinement over the sight opening, the cylindrical case having been revolved down ninety degrees from the position shown in Figure I so it will overlie the spherical case, allowing the two cases to be shown in one cross section.

Figure IV is a cross section on line IV—IV of Figure I.

Figure V is a cross section on line V—V of Figure I, with the auxiliary prism in alinement with the Maddox rod.

Figure VI is a detached view of the front of the spherical lens case showing attachment of a one-eighth dioptre auxiliary lens for splitting the powers of the spherical lenses in the case.

Figure VII is a detached detail view of the multiple point bearing spring on the lens carriers shown in section in Figure III.

Figure VIII is a diagrammatic plan view of the front cylinder dial.

Figure IX is a view showing front and side elevations of the positioning spring located at IX in Figure I.

Figure X is a diagrammatic plan view of the rear cylinder dial.

Figure XI is a diagrammatic plan view of the front spherical dial.

Figure XII is a diagrammatic plan view of the rear spherical dial.

Figure XIII is a detached cross sectional view of a part of the cylinder lens cases showing the plate for attaching the cases to their holders and which also acts as a friction plate to hold the cylinder case in any desired stopped position.

Figure XIV is a partial elevation of the supporting bracket showing the connection of the spherical lens series to the support.

Figure XV is a partial cross section on line XV—XV of Figure XIV.

Figure XVI is a partial elevation of the supporting bracket showing the connection of the cylindrical lens series to the support.

Figure XVII is a partial cross section on line XVII—XVII of Figure XVI.

Figure XVIII is an enlargement of a portion of Figure XVII showing the friction bearing connecting the cylinder series to the support.

Figure XIX is a partial elevation showing the rotary prism unit.

Figure XX is a partial elevation showing the Maddox rod unit.

The instrument in general comprises a supporting and attaching arm 1, a standard 2, separable cross arms 3, rearwardly projecting supports 4 which carry the testing units comprising the spherical unit 5, the cylindrical unit 6, the rotary prism unit 7, the Maddox rod unit 8, and the displacing prism unit 9, all of which will be described in detail hereafter.

The spherical unit 5 is supported by a bracket plate 10 rising from the rear end of the rearwardly projecting supports 4. It consists of two dial plates 11 and 12 pivoted on the bracket plate at 13. These dial plates are protected by cover plates 14 and 15 at front and rear. Mounted in the front dial plate 11 in my preferred form are eleven spherical lenses 16, ranging from .25 to 2.75 diopters in subdivisions of quarter diopters each, one space marked 0, Figure XI, being left blank. Mounted in the rear dial plate 12 are also, in the preferred form, eleven spherical lenses 16. Some of these are of minus power and some of plus power, the plus powers being 3.00, 6.00, 9.00, 12.00, and 15.00 diopters, and the minus powers being 3.00, 6.00, 9.00, 12.00, 15.00, and 18.00 diopters, with one space left blank between the plus 3.00 and the minus 3.00. The powers of the lenses are marked on the dial plates as indicated in Figures XI and XII. There is an opening at 17 in the front cover plate 14, as shown in Figure I. Through this opening the focal powers of the lenses exposed at the sight opening 18 are read. The lens carriers or dial plates are preferably knurled on their edges as they are rotated by means of the fingers of the operator contacting with the peripheral edges.

The arrangement of the lenses in these two rotatable carriers constitutes a novel construction in that all the fractional units are contained in one dial. The powers in one dial step up by quarter diopters from 0 to 2.75 and the lowest power in the other dial is 3.00 diopters.

To obtain plus powers from 0.00 to 2.75 the individual lenses in the front dial are brought consecutively into operative position at the sight opening. To obtain plus 3.00 diopter the plus 3.00 in the back dial is brought into position at the sight opening, and the blank in the front dial. To obtain plus powers from 3.25 to 5.75, the plus 3.00 diopter in the rear dial remains in position while the lenses in the front dial are consecutively brought into operative position at the sight opening, thus giving additional powers which added to the 3.00 diopters gives the specified powers. Similarly, the still higher plus powers are obtained by bringing into operative position the plus 6.00, 9.00, 12.00, and 15.00 diopters, making the maximum plus power 17.75 diopters.

An especially novel feature is the arrangement whereby the negative values are secured. To obtain the minus powers from .25 to 2.75, minus 3.00 in the back dial is first placed in operative position at the sight opening, whereupon the plus 2.75 in the front dial is likewise placed in operative position at the sight opening, thus giving a negative power of .25. Upon shifting the plus powers in the front dial from 2.75 downwards to 0, all of the minus spherical powers are consecutively obtained in quarter diopter subdivision, until 0 is reached in the front dial, when minus 3.00 is obtained. Similarly, the minus powers from 3.25 to 6.00 diopters are obtained by placing minus 6.00 into operative position and shifting the lenses in the other dial in inverse order, as with the minus 3.00 previously described. In the same manner all of the minus powers up to 15.25 diopters are obtained by bringing into operative position the minus 9.00, 12.00, 15.00, and 18.00 diopter lenses in the rear dial in conjunction with the successive lenses in the other dial.

The lenses in the front dial may be of minus power instead of plus, in which event the minus powers would be obtained in the same manner as the plus powers, as described above, and the plus powers in the same way as the minus powers. If desired I may vary the number of lenses and their powers thus increasing or decreasing the range of powers obtainable.

To insure correct positioning of the lenses at the sight opening a multiple bearing spring clip is provided for each dial as indicated at 19, Figure VII and Figure III. This spring is fitted by means of the tongue 20 in a groove of the central pivot stud 13. One or more of the bearing points is raised as at 21 to fit into corresponding depressions in the dial when the lens is in operative position at the sight opening. Rotative pressure on the dial wheel will release the spring stop so that the wheel may be advanced as desired. Stop points are provided for locking the lens. Openings are made in the front and back cover plates in line with the sight opening 18, which align with the lenses in the dial and the sight openings in all the other units.

Adjacent to the spherical lens carrier on the bracket 10 on the side thereof nearest the cover plate 14 of the spherical lens carriers, see Figure VI, is a pivoted cell 22 in which is mounted a single one-eighth diopter spherical lens 23. The cell 22 is pivoted at 24 so that the lense 23 may be swung into or out of alinement with the sight opening 18. When this lens is in position before the sight opening all the eight diopter subdivisions are obtained.

The cylindrical unit 6 is also supported by the bracket plate 10. This unit is made up of front and back cover plates 25 and 26; front and back lens dials or carriers 27 and 28, which are pivoted in the cover plates at 29. The cover plates have sight openings in line with the sight opening 18 and they are pivoted to revolve about said sight opening. In the dial plate 27 are preferably mounted five cylindrical lenses 30, one hole being left blank. These lenses range from .25 to 1.25 diopters by quarter diopters, and their powers are indicated thereon as shown at 31 in Figure VIII. In the dial 28 are also preferably five cylindrical lenses and one blank opening, these lenses being .12, 1.50, 3.00, 4.50 and 6.00 diopters. The powers of these lenses are also indicated on the dial at 32, Figure X. There is an opening in the front case at 33 through which the powers of the lenses in alinement with the sight opening may be seen. The peripheral edges of the dials are knurled for rotation by the fingers.

The required cylindrical powers are obtained through employment of the lenses in the dials singly or in combination by exposing one or two lenses at the sight opening, as required.

This cylinder unit is eccentrically positioned with respect to the sight opening 18 on the rotatable disc 34 carried by the supporting bracket 10, the whole cylinder unit being rotatable about the center of the sight opening 18 for the procurement of the required cylinder axes. The cylinder lenses in the dials are preferably mounted with their axes radial with the dial, hence a rotation of the cylinder unit about the center of the sight opening varies the axis of the cylinder lens exposed at the sight opening in accordance with the rotation of the said cylinder unit. On the bracket 10 contiguous with the rotatable disc 34 which carries the cylinder unit 6 is a degree scale 35 which acts in cooperation with the indicator 36 on the disc 34 to indicate the axis of the cylinder when in operative position at the sight opening. The whole cylinder unit may be turned by the handle 37 for the procurement of the required cylinder axis. The sight opening 18 may be closed by the shutter or blinder pivoted to the cylinder case.

It will be noted that the scales for indicating the axes of the cylindrical lenses are located on the inner side of the cylinder cases, that is, on the side nearest the nose of the patient on each side of the instrument. The cylinder case needs only a rotation of slightly over 180 degrees to obtain the various axes required. If the rotation were greater than this the cases or parts thereof would come in contact with the patient's face or with each other. So far as I am aware I am the first to apply this principle to a binocular instrument, as it is only with the most extreme nicety that this principle can be employed in such an instrument.

Figures XVII and XVIII shows the means by which the back cover plate 26 of the cylinder series is secured to the rotating plate on the supporting bracket. The plate 64 acts both as an engaging plate to secure the case to the rotating plate and as a friction plate to hold the cylinder case against further rotation when it is stopped in any desired position.

Referring to Figures XIII, XVI, XVII, and XVIII of the drawings, it will be seen that the bracket plate 10 is scored out forming a central rib around the sight opening. In the sight opening, and resting on the shoulder thereof is the plate 34, which is so fitted in the ring around the sight opening that it is free to rotate therein. This ring is held in place by a plate 64 on the other side of the central rib in the sight opening and is attached to the plate 34 by screws. The plate 64 also acts as a friction plate for regulating the ease of rotation of the plate 34 in its bearings. It will be noted that the flange of the plate 34 rests on one side of the rabbet in the sight opening, while the plate 64 rests in the rabbet on the other side of the sight opening. Therefore, if the screws holding the plate 64 to the bushing 34 are loosened the central rabbet between the flange of the plate 34 and the plate 64 is not gripped so tightly by the two plates and the bushing may be turned around very easily, whereas if the plate 64 is screwed up tight onto the plate 34, coming in contact with the walls of the rabbet, the central rabbet is gripped tightly between the flange of the plate 34 and the face of the plate 64 and the bushing cannot be turned so easily on account of the friction of the plate 64 and the flange of the plate 34 on the faces of the central rabbet. The friction, therefore, or the tightness or looseness of the bushing is regulated by the way the screws attaching the plate 34 to the plate 64 are drawn up or let out. By loosening or tightening the screws holding the plate 34 to the plate 64 the desired tension may be obtained. On the other side of the plate 34 is secured the cover plate 26 of the cylinder series. The discs containing the cylindrical lenses are pivoted to this cover plate on the pivot 29, as shown in detail in Figures XVII and XVIII.

The object of the rotatable plate 34 is to permit the whole cylinder series as an entirety to be rotated about the sight opening as a center, as the cylinder series is secured to the rotative plate 34. This permits the whole cylinder case without any rotation of the lenses, to be turned about the sight opening and thus regulate the axes of the cylindrical lenses as they are applied to the eye of the patient. This is an important feature of applicant's structure.

It will be understood that the cylindrical lenses have two actions, one a rotative action on the pivot 29 in the covers of the cylinder series, so that each of the lenses in the disc is brought successively before the sight opening; and a second independent rotative action on the plate 34 about the sight opening as a center carrying the case containing all the lenses so that the axes of all the lenses are automatically adjusted to a fixed axis before the sight opening, which is regulated by the motion of the rotative plate 34. This allows all the lenses in the cylinder series to be brought at any desired axis before the eye of the patient and is obtained without rotating the whole lens series on the pivot 29.

The rotary prism unit 7 is carried on a bracket 39 pivoted on the rearwardly extending support 4. Rotatably mounted in the bracket 39 is a double rotary prism 40 whereby any desired prism equivalent ranging from 0 to 15 prism diopters may be obtained by turning the pinion 41 as indicated upon the dioptric prism scale 42 on the face of the prism case and the indicator 43 placed upon the prism cell. Surrounding the prism case is the degree scale 44 which acting in cooperation with a line indicator on opposite sides of the prism case provides exact means for locating the base of the derived prism equivalent in any desired angular position before the eye. The mobile prism unit contains two prisms of equal value each carried in a separate cell having gear teeth about their outer periphery which engage a pinion located between them. The action of the pinion gives the prisms inverse rotation and consequent resultant prism equivalents, as indicated by the scale.

Pivoted to the rear of the supporting bracket 39 is a supplemental prism support 45 (see Figure XIX) which carries a rotatable cell 46 mounted in the arm 45 so as to be rotatable therein by the turning of the handle part 46'. In the rotatable cell 46 is mounted an auxiliary prism 47 which is turned to desired position by the handle of the cell 46'. The whole arm 45 may be rotated on the pivot 48 to throw the lens 47 in line with the lens 40, the action being that the lens 47 may be aligned with the lens 40 and the lens 40 turned to desired angle by means of the cell 46 and its handle portion.

This prism when in operative position with respect to the mobile prism unit 40 adds its power to that of the mobile prism. This auxiliary prism may be thrown in or out of alinement with the mobile prism as desired by swinging it on its pivot. The mobile prism unit may be swung into or out of alinement with the sight opening 18 by swinging it about its support 4. On the bracket 39 is an adjustable stop member 48, and on the support 4 is another stop member 49, these two stops being adapted to correctly position the mobile prism unit before the sight opening.

The Maddox rod unit 8 is carried on a bracket 50 pivoted on the rearwardly extending support 4. Mounted in the bracket 50 is a rotatable plate 51 having central opening and a handle 52 for rotating it. Adjustably pivoted on the plate 51 is a mounting 53 which carries a Maddox multiple rod lens 54 which may be swung into or out of alinement with the central opening in the plate 51. Partially surrounding the plate 51 is a degree scale 55 carried by the bracket 4, which in cooperation with an indicator 56 on the plate 51 provides means for determining an oblique positioning of the optical axis of the Maddox rod lens.

Pivoted to the front of the bracket 50 is a cell arm 57 which carries a displacing prism 58. By swinging the arm 57 into alinement with the opening in the plate 51 the prism may be placed in operative position required.

This prism is used for the purpose of displacing the test object with respect to its position as seen by the other eye, and is employed when making a monocular muscle test. It may be also employed when making a test for cyclophoria in conjunction with the Maddox rod lens. This unit has the stop mechanism to position it before the sight opening, as has been described for the rotary prism unit 7.

To make an examination with this instrument the distance between the sight openings is adjusted to conform with the interpupillary dimensions of the patient, by means of the screw 63. In testing one eye the other is blanked by the blinder 38, being moved over the sight hole. The refraction of the eye is then tested through the use of the spherical and cylindrical lenses which are moved into place through the rotation of their respective dials by means of the fingers. When the refraction of the first eye is tested the blinder is removed from the other eye and applied to the eye first tested. When the last eye has been tested the blinder is then removed from the other eye leaving both eyes unobstructed and in the field of examination. With the refractive corrections in place if any be required the muscle tests are then made in the following manner. With a small point of light as a test object five or six meters distant the Maddox multiple rod is thrown in alinement with the sight opening with corrugations vertical, and if in position before the right eye only a horizontal streak of light will be seen and the normal test object or point of light by the other eye. If the streak of light cuts the point of light there is no manifest vertical imbalance. The Maddox rod is rotated until the corrugations lie in the horizontal plane whereupon the right eye will see a vertical streak of light and the left eye a point of light. If the streak cuts the dot there is no manifest lateral imbalance. Should the streak fail to cut the dot a monocular muscle test should be made. This is accomplished by swinging the Maddox rod lens out of operative position and swinging the displacing prism 58 into operative position before the sight opening. If the displaced object or point of light is vertically in line with the upper or true point of light seen by the other eye, the eye under test is in horizontal balance. Should the lower or displaced point of light be not directly below the true object, the double rotary prism unit should be placed in operative position before the sight opening with zero graduation vertical and such prism power turned on by rotating the pinion 41 as to bring the two images into vertical alinement. The prism indicator and scale will show the power of the corrective prism and the position of its base, hence the amount of lateral deviation of that eye. The other eye may be tested for lateral imbalance in similar manner after removing the Maddox rod unit from before the right eye and placing the one on the opposite side before the left eye.

To make a monocular test for vertical imbalance of the right eye, the double rotary prism should be placed in operative position before the sight opening with graduations set at zero, and the auxiliary prism 47 should be brought into visual alinement with the sight opening and rotated by the handle 46, to position it with base towards the nose, the position of the handle indicating the base. The point of light will be displaced to the right side of the true point of light seen by the left eye, and if it is in horizontal alinement there will be no manifest vertical imbalance of the right eye. Should the two objects not be in alinement the double rotary prism should be positioned with zero graduation horizontal and then sufficient prism power turned on to cause the false image seen by the right eye to align with the true image seen by the left eye. The indicator and scale will measure the amount of prism power employed and give the position of the base. The vertical imbalance of the other eye may be tested in like manner.

To test the balance of the oblique muscles monocularly the Maddox rod units 8 should be placed in operative position before both eyes and the Maddox rod lenses placed in operative position with their corrugations in vertical alinement. The displacing prism 58 should then be placed before the right eye and if the lower horizontal streak of light is parallel with the upper one there is no manifest imbalance of these muscles. This displacing prism then may be removed and the one on the left side positioned for testing the oblique muscles of the left eye. Should the lower streak seen by either eye be other than parallel with the upper streak of light the Maddox rod should be rotated by the handle 52 to such position as will bring the lower streak into exact parallelism with the upper streak whereupon the scale 55 and indicator 56 will denote the amount and character of the cyclophoria present. Should any of these muscle tests disclose an imbalance in both the vertical and horizontal meridians of either one or both eyes, a correcting prism with obliquely located base may be readily found with the use of the double rotary prism 40 and the degree scale 44.

This instrument, as will be seen from the foregoing description, is binocularly complete for measuring not only the refraction but also the status of the extrinsic ocular muscles without recourse to extraneous means, nor through the cooperation of any one of the elements contained on the opposite side of the instrument. The completeness of each side of this instrument enables the operator to measure for every refractive and muscular defect of vision without disturbing the normal poise of the other eye, a highly desirable and important feature in all eye examination, and a prime object of my invention.

It will be understood that while I have described one side only the instrument is a binocular one and the other side is identical but to the other hand.

Eye cups 59 are provided at the rear of the sight opening 18. A spirit level 60 is mounted on the center block 61 and is adjusted by thumb screw 62 fitted onto the standard 2.

The distance between the sight openings may be varied by means of the right and left hand threaded screw 63 in nuts carried by the slides 3.

The method of operation has been set forth in the detailed description of the various units comprising the instrument. It will, however, be understood that all of the adjustable units may be used singly or in combination as required.

The universal adaptability of the mobile prism unit permits of the exercise of any one alone or of any one of the vertical with either one of the lateral muscles simultaneously without energizing any of the other muscles.

The eye of the patient is applied at eye cups 59 by means of the adjustable support which makes contact with 1 in the form of a wall bracket or other suitable fixture.

Having described the invention, attention is called to certain novel features, among which are the following: A mobile prism unit of low degree having extended graduations for the exact measurement of small monocular errors which cannot be accurately estimated in units of higher degree with corresponding narrower graduations in the scale, in addition to which I have provided a supplementary prism of fixed degree for increasing this range when desired, the higher and lower powers both being read from the same scale, and further definite means for laterally displacing the test object beyond the fusion area of the eye being tested; a Maddox rod unit supplemented by an auxiliary prism which may be thrown in or out of operative position, and which may, therefore, be used either with or without the Maddox rod, as desired, and as is most important in testing the balance of the lateral ocular muscles and also in testing for partial rotations of the eye known as cyclophoria,—by means of these two auxiliary prisms the test object may be displaced either vertically or horizontally beyond the fusion range of the eye under examination independent of the mobile prism unit which last mentioned unit can be employed for measuring any horizontal or vertical deviations of the visual line, otherwise known as muscular imbalances; the arrangement of the spherical lens series in their dials; the splitting of powers of the spherical lenses by means of the supplemental one-eighth diopter lens, and the multiple point spring stop for alinement of the lenses.

Having described my invention, what I claim is:

1. In an instrument of the character described, the combination of a testing unit support, a bracket pivotally mounted on the support, a plate having a central opening rotatably mounted on the bracket, means for rotating the plate, a cell plate pivotally mounted on the rotatable plate, a lens in the cell adapted to align with the opening in the plate, a second cell plate pivotally mounted on the bracket, and a displacing prism mounted in the cell adapted to align with the opening in the rotatable plate.

2. In an instrument of the character described, the combination of a testing unit support, a bracket pivotally mounted on the support, double prisms rotatably mounted on the bracket, means for rotating the prisms in opposite directions, a cell plate pivotally mounted on the bracket, a rotatable cell on the cell plate adapted to align with the double prisms, means for rotating the cell and a prism in the rotatable cell.

3. In a device of the character described in combination with a series of cylindrical lenses and a bracket support having a sight opening, a rotatable friction bearing, comprising annular rabbets around the sight opening in the bracket plate, a bushing having a flange fitting in the rabbet on one side and a barrel portion extending through the sight opening, a friction plate in the rabbet on the opposite side from the bushing rabbet, screw devices for securing the friction plate to the bushing whereby the friction plate can be made to engage the rabbet in the supporting bracket as tightly or as loosely as desired, and means for securing the cylindrical series to the bushing.

4. In a device of the character described, in combination with a series of cylindrical lenses and a bracket plate support having a sight opening, rabbeted recesses in the bracket plate support surrounding the sight opening, an L-shaped bushing fitting the rabbet on one side of the bracket plate and extending through the sight opening, a friction plate in the rabbet on the opposite side from the bushing rabbet, operable means for securing the friction plate to the bushing positively in any desired position whereby the distance of the friction plate from the rabbeted surface of the bracket plate may be fixed in order that the bushing may be turned as freely or as tightly as desired, and means for connecting the series of cylindrical lenses to the bushing.

5. In a device of the character described, a pair of rearwardly extending supports, a pair of vertical brackets on the supports having sight openings, a series of spherical lenses rotatably mounted on the brackets and adapted to successively align with the sight openings, a friction bearing in the sight opening comprising a rabbeted bushing, a friction plate, and means for fixedly regulating the distance between the bushing and the friction plate to give the bushing the desired looseness or tightness in its bearing, a series of cylindrical lenses rotatably mounted in a cover plate, and means for securing the cover plate to the bushing.

6. In a device of the character described, a pair of rearwardly extending supports, a pair of bracket plates on the supports having sight openings, rabbeted grooves surrounding the sight openings, a bushing in one of the rabbets, a friction plate in the other of the rabbets, and threaded means adapted to secure the friction plate and bushing together at any desired separation, a series of spherical lenses rotatably mounted on the brackets and adapted to successively align with the sight opening, a series of cylindrical lenses rotatably mounted on separate supporting plates and adapted to successively align with the sight opening, and means for securing the cylindrical lens supporting plates to the bushings.

7. In an instrument of the character described, a rearwardly extending support, a bracket plate on the support having a sight opening, rabbeted grooves around the sight opening, an L-shaped bushing in one of the rabbets and a friction plate in the other rabbet groove for connecting the friction plate to the bushing whereby the distance between the two may be regulated to give the desired looseness or tightness to the bearing, lens dials rotatably mounted on a separate supporting plate, means for connecting the dial supporting plate to the bushing, and a scale surrounding the bushing adapted to indicate the axis of the lenses in the dial.

8. In a device of the character described, a supporting bracket having a sight opening, a series of spherical lenses pivoted on the bracket and adapted to successively align with the sight opening, a bushing bearing in the sight opening, a series of cylindrical lenses pivoted independently of the bracket to align with the sight opening, and means connecting the cylindrical series of lenses and the bushing bearing in the sight opening.

9. In a device of the character described, a support, an arm pivoted on the support, a double rotary prism unit having two prisms intergeared to provide varying prism powers mounted on the pivoted arm, a second arm pivoted on the first arm and an auxiliary prism lens mounted on the second arm and adapted to be thrown into or out of operative position with respect to said double rotary prism unit by rotating the second arm on its pivot.

10. In a device of the character described, a support, an arm pivoted on the support, a double rotary prism unit having two prisms intergeared to provide varying prism powers mounted on the pivoted arm, a second arm pivoted on the first arm, an auxiliary prism mounted on the second pivoted arm and adapted to be thrown into or out of operative position with respect to said double rotary prism unit by the rotation of the second arm on its pivot, and means for rotating the auxiliary prism in its mounting.

11. In a device of the character described, a pair of separated supports, a pair of brackets on the supports having sight openings establishing sight lines, operable means to regulate the distance between the supports, means for correcting the refractive errors of the eye mounted on the supports, and means for correcting the muscular errors of one eye without disturbing the poise of the other eye mounted on the supports and comprising a double rotary prism unit provided with an auxiliary high power prism unit that may be thrown into or out of operative position with the rotary prism unit, and a Maddox rod unit comprising a Maddox rod lens and an auxiliary prism that may be thrown into or out of operative position with the same.

12. In a device of the character described, a pair of supports, a pair of brackets on the supports having openings, operable means to separate the supports, means for making cylindrical corrections of the eye including a plurality of optical elements mounted on the supports, means for rotating the cylindrical correcting means about the sight openings as a center to fix the axis of the cylindrical correcting means, and friction means on the rotating means for holding the cylindrical correcting means in any desired stopped position.

13. In a device of the character described, a supporting bracket having a sight opening, a rotatable bearing in the sight opening, a series of cylindrical lenses mounted to rotate in a casing, and means for connecting the casing to the rotatable bearing whereby the casing may be rotated about the sight opening as a center, and the lenses made to successively align with the sight opening when rotated on their casing mounting.

14. In a device of the character described, a pair of separated supports, a pair of brackets on the supports having sight openings establishing sight lines, operative means for regulating the distance between the supports, primary and secondary rotatable spherical lens carriers, spherical lenses in the lens carriers mounted on the brackets, those in the primary carriers varying in power by fractions of a diopter and those in the secondary carriers by dioptric units, single auxiliary spherical lenses intermediate in power of the primary powers mounted on the lens carriers, means for throwing the auxiliary lenses into or out of operative alinement with the sight openings, primary and secondary rotatable cylindrical lens carriers mounted on the brackets, cylindrical lenses in the lens carriers, means for moving the lenses into or out of alinement with the sight openings and pivotal means on the brackets adapted to permit the primary and secondary cylindrical lens carriers to be rotated about the sight openings as a center.

15. In a device of the character described, a pair of supports, a pair of brackets on the supports having sight openings, operable means to regulate the distance between the sights, primary and secondary cylindrical lens carriers rotatably mounted on the brackets, cylindrical lenses in the lens carriers, rotatable discs rotatable about the sight opening as a center, means for securing the cylindrical lens carriers to the rotatable discs, and friction means between the brackets and discs to hold the cylindrical carriers in desired stopped position.

16. In a device of the character described, a pair of supports, a pair of brackets on the supports having sight openings, operable means to regulate the distance between the sight openings, primary and secondary cylindrical lens carriers mounted on the brackets, lenses in the carriers, rotatable discs mounted on the brackets adapted to rotate about the sight openings as a center, means for securing the lens carriers to the rotatable discs, friction means between the brackets and discs to hold the cylindrical lens carriers in stopped position, and spring stops engaging the lens carriers and adapted to frictionally stop the cylindrical lens carriers in desired position before the sight openings.

17. In a device of the character described, a support, a bracket on the support having a sight opening, a rotary prism unit on the support, means for throwing the rotative prism unit into or out of alinement with the sight opening, two rotary prisms of low power mounted in the double prism unit, means for rotating the prisms in inverse direction, a high power auxiliary prism mounted on the rotary prism unit, means for throwing the prism into or out of alinement with the two cell rotary prism unit and means for rotating the prism.

18. In a device of the character described a support, a bracket on the support having a sight opening, a rotary prism unit support on the support, means for throwing the prism support into or out of alinement with the sight opening, two rotary prisms of low power mounted in the prism support, means for rotating the prisms in inverse direction, a high power prism mounted on the prism support, means for throwing the prism into or out of alinement with the two cell rotary prism unit, means for rotating the prism, and a scale surrounding the double rotary prism unit on which both the high and lower powers of the various prisms may be read.

19. In a device of the character described, a support, a bracket on the support having a sight opening, a supporting arm for a Maddox lens attachment on the support, rotative means for throwing said arm into or out of operative alinement with the sight opening, a rotative plate having a sight opening mounted on said arm, a support on the rotative plate, a Maddox lens mounted in the support, rotative means for throwing said Maddox lens into or out of alinement with the sight opening, and an auxiliary lens mounted on the Maddox lens support, and rotative means for throwing said auxiliary lens into or out of alinement with the sight opening.

20. In a device of the character described, a support, a pivoted arm on the support, a rotatable plate having a sight opening mounted on the pivoted arm, a second arm pivoted on the rotatable plate, a lens mounted in the second pivoted arm and adapted to be rotated about the pivot of the arm into line with the sight opening, a third arm pivoted on the first arm, and a lens mounted in the third arm adapted to be thrown in line with the sight opening by rotation about the pivot of the third arm.

21. In a device of the character described, a support, a lever pivoted on the support, a pair of double rotary prism units mounted on said lever, means for rotating the prisms in opposite directions, a second lever pivoted on the first, a lens rotatably mounted on the second lever adapted to be thrown into or out of alinement with the double rotary prisms.

22. In a device of the character described, a support, a lever pivoted on the support, a rotatable plate having a sight opening on the lever, an arm carried on the rotatable plate, a lens mounted in the arm and adapted to be rotatively thrown into or out of alinement with the sight opening, a second arm pivoted on the lever, and a lens mounted in the second arm adapted to be thrown into or out of alinement with the sight opening.

23. In a device of the character described, a support, a bracket secured to the support and having a sight opening, a series of spherical lenses rotatably mounted on one side of the bracket to successively align with the sight opening, a friction bearing in the sight opening of the bracket comprising a bushing, a friction plate and positive means for regulating the distance between the end of the bushing and the friction plate to positively regulate the desired tightness or looseness of the friction bearing, a series of cylindrical lenses rotatably mounted on a supporting plate, and means for fastening the cylindrical lens supporting plate to the bushing on the opposite side of the bracket from the spherical lenses whereby the cylindrical lenses are adapted to align with the sight opening and the series as a whole to revolve about the sight opening on the friction bearing.

24. In a device of the character described, a support, a bracket secured to the support and having a sight opening, a series of spherical lenses rotatably mounted on one side of the bracket to successively align with the sight opening, an arm pivoted on the bracket between the spherical lenses and the sight opening, a lens mounted in the arm adapted to be thrown into or out of alignment with the sight opening about the pivot of the arm, a friction bearing in the sight opening comprising a bushing and a friction plate, unyielding adjustable means for regulating the distance between the bushing and the friction plate, a series of cylindrical lenses rotatably mounted on a support on the other side of the bracket, and means to fasten said support to the bushing of the friction bearing whereby the cylindrical lenses are adapted to successively align with the sight opening in the bracket and to be rotated about the sight opening on the friction bearing to change the axis of the lens before the sight opening.

In testimony whereof I have affixed my signature, in presence of two witnesses.

HENRY L. DE ZENG.

Witnesses:
S. W. CAFFERTY,
C. H. KERR.